UNITED STATES PATENT OFFICE

PAUL DIETERLE, OF BUFFALO, NEW YORK, ASSIGNOR TO NATIONAL ANILINE & CHEMICAL COMPANY, INC., OF NEW YORK, N. Y., A CORPORATION OF NEW YORK

PROCESS OF MAKING AMINO-AZO COMPOUNDS

No Drawing. Application filed November 2, 1927. Serial No. 230,696.

This invention relates to an improvement in the method of making aromatic amino-azo bodies by coupling aromatic diazo compounds with aromatic amines or their N-substituted derivatives.

In coupling or combining an aromatic diazo compound with an aromatic amino compound to produce an amino-azo body in the presence of an aqueous medium, it is well known that the success of the coupling depends on the nature of the interacting components and upon the conditions under which the reaction is carried out. In many cases the diazo component is relatively unstable and undergoes considerable decomposition before the coupling is completed, particularly if the reaction extends over a considerable period of time. In other cases, when one or both of the interacting components are present in the solid state and substantially insoluble, or nearly so, in the aqueous solvent or medium in which the coupling is being carried out, the reaction is ordinarily slow and unsatisfactory in performance. In such cases, the common practice has been to produce the solid, insoluble component in a finely divided physical state, usually by precipitation, just prior to coupling it with the other component. It has also been heretofore proposed to carry out the coupling in the presence of an organic solvent soluble in water.

The process of the present invention comprises the production of an amino-azo body by coupling an aromatic diazo compound with an aromatic amino compound in the presence of an organic liquid, particularly a liquid organic solvent, which is substantially insoluble or immiscible in water, at least one of the coupling components being soluble in the solvent but relatively insoluble in water. The reaction may take place in the presence or absence of a dispersing agent. The immiscible organic liquid or solvent acts as an adjuvant in the reaction mixture and materially lessens the time required to complete the coupling over that required when the solvent is absent. The present process is particularly applicable to the production of amino-azo bodies by coupling or combining diazo-bodies with aromatic primary, secondary or tertiary amines, and their alkoxy derivatives, when either one or both of the coupling components are ordinarily solids at the temperature at which the coupling is carried out.

The following specific examples will further illustrate the invention, but it will be understood that the invention is not limited thereto. The parts are by weight.

*Example 1.*—29 parts of alpha-naphthylamine are dissolved in 15 parts of tetrachlorethane and the solution at a temperature of 30° C. is added to a well-stirred slurry of diazo-salicylic acid in 600 parts of water and 12 parts of hydrochloric acid, 20° Bé., at a temperature of 20°–30° C., the diazo-salicylic acid being prepared in the usual way from 31.5 parts of p-amino salicylic acid. The coupling starts to take place immediately. The mixture is then stirred at a maintained temperature of 30°–40° C. until the coupling is substantially complete. This usually requires about 30 to 36 hours. The amino-azo body, which separates out, may be isolated in any suitable and well-known manner. It is composed principally of a compound which, in the free state, has the following probable formula:

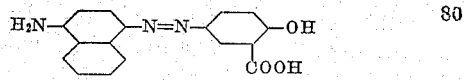

The coupling of diazo-salicylic acid with alpha-naphthylamine if carried out as described above but in the absence of the tetrachlorethane usually requires about 5 to 6 days for completion.

*Example 2.*—To a solution of 39 parts of the sodium salt of metanilic acid (3-aminobenzene-sulfonic acid) in 500 parts of water there is added 22 parts of concentrated sulfuric acid and the mixture diazotized in the usual way at a temperature of about 10° C. by the addition of sodium nitrite. 34 parts of diphenylamine are dissolved in 15 parts of tetrachlorethane and cooled to about 30° C. It is then added to the well-stirred solution of diazotized metanilic acid maintained at a temperature of about 10° C. and to which one-half to one part of Monopol oil or Turkey red oil has been added. The organic solution becomes more or less dispersed throughout the aqueous medium and coupling readily takes place. At first, some diphenylamine may separate out but as the coupling proceeds it becomes redissolved. The coupling is complete in about 20 to 24 hours. The amino-azo dye, which separates out, may be isolated in any well known manner. In the free state, it has the following probable formula:

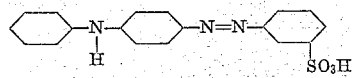

Ordinarily, about 75 to 100 hours are required to complete the coupling of diazotized metanilic acid with diphenylamine in the absence of an immiscible organic solvent. It will be further noted that in the above example the amount of acid present in the reaction mixture is considerably less than that generally employed in coupling diphenylamine with a diazo component when no immiscible organic solvent is present.

In the above examples, other organic liquids or solvents which are insoluble or immiscible with water may be used, such as benzene, toluene, solvent naphtha and other hydrocarbons of the benzene series, also o-dichlorbenzene, carbon tetrachloride, ethylene dichloride, etc. Immiscible solvents which are chemically inert toward the coupling components and which dissolve appreciable quantities of the amino component entering into the coupling reaction are especially suitable for use.

In place of Monopol or of Turkey red oil, other well-known dispersing agents may be used, such as starch, glue, etc. Non-hydroxylic organic solvents, i. e., solvents which contain no hydroxyl group in their composition, are of particular value.

It will be understood that the present invention is applicable to the production of amino-monazo and to amino-polyazo bodies, and that the term "amino-azo" bodies or compounds includes such bodies.

Further, in place of alpha-naphthylamine or diphenylamine, other aromatic amines soluble in the organic solvent utilized but relatively insoluble in water may be used such as, for example, beta-naphthylamine, alpha-amino-beta-naphthol-ethyl ether, amino-cresol-methyl ether, etc.

I claim:

1. In the process of making an aromatic amino-azo compound, the improvement which comprises coupling an aromatic diazo compound with an aromatic amino compound in the presence of water and of an organic solvent immiscible in water, one of said coupling components being relatively insoluble in water but soluble in said organic solvent.

2. In the process of making an aromatic amino-azo compound, the improvement which comprises coupling an aromatic diazo compound with an aromatic amino compound in the presence of water and of an organic solvent immiscible with water and a dispersing agent, one of said coupling components being relatively insoluble in water but soluble in said organic solvent.

3. In the process of making an aromatic amino-azo compound, the improvement which comprises coupling an aromatic diazo compound with an aromatic amine selected from the group consisting of primary amines, secondary amines, tertiary amines, and alkoxy derivatives of said amines, in the presence of water and of a non-hydroxylic organic solvent immiscible with water, said amine being relatively insoluble in water but relatively soluble in said organic solvent.

4. In the production of an amino-azo compound, the process which comprises subjecting an aromatic amino compound, which is relatively insoluble in water, in solution in an organic liquid solvent immiscible with water to the action of an aqueous solution or suspension of an aromatic diazo compound.

5. In the production of an amino-azo compound, the process which comprises coupling an aromatic secondary amine with an aromatic diazo compound in the presence of water and of an organic solvent immiscible with water, said secondary amine being relatively insoluble in water but soluble in said organic solvent.

6. In the production of an amino-azo compound, the process which comprises coupling an aromatic secondary amine with an aromatic diazo compound in the presence of water, a chemically inert organic liquid immiscible with water, and of a dispersing agent, said secondary amine being relatively insoluble in water but soluble in said organic liquid.

7. In the production of an amino-azo compound, the process which comprises coupling diphenylamine with an aromatic diazo compound in the presence of water and of an organic solvent immiscible with water.

8. In the production of an amino-azo compound, the process which comprises coupling diphenylamine with an aromatic diazo compound in the presence of water, an organic solvent insoluble in water, and a dispersing agent.

9. In the production of an amino-azo compound, the process which comprises coupling diphenylamine with diazotized 3-aminobenzene sulfonic acid in the presence of water, tetrachlorethane, and Monopol oil.

10. In the process of coupling an aromatic amine with an aromatic diazo compound in the presence of an organic solvent immiscible with water, at least one of said coupling components being relatively insoluble in water but soluble in said organic solvent, the improvement which comprises carrying out the reaction in the presence of water and of a dispersing agent.

11. In the production of an amino-azo compound, the improvement which comprises adding a solution of an amino body in an organic liquid immiscible with water to a diazo body in the presence of an aqueous medium, the said amino body being relatively insoluble in water.

12. In the production of an amino-azo body, the improvement which comprises adding an amino body, which is relatively insoluble in water dissolved in chemically inert non-hydroxylic organic solvent to a diazo body in the presence of water and of a dispersing agent.

In testimony whereof I affix my signature.
PAUL DIETERLE.